US010538269B2

(12) United States Patent
Tarum et al.

(10) Patent No.: US 10,538,269 B2
(45) Date of Patent: Jan. 21, 2020

(54) STEERING SYSTEM HANDWHEEL ANGLE DETERMINATION

(71) Applicant: STEERING SOLUTIONS IP HOLDING CORPORATION, Saginaw, MI (US)

(72) Inventors: Carl D. Tarum, Saginaw, MI (US); Matthew A. Tompkins, Saginaw, MI (US)

(73) Assignee: Steering Solutions IP Holding Corporation, Saginaw, MA (US)

(*) Notice: Subject to any disclaimer, the term of this patent is extended or adjusted under 35 U.S.C. 154(b) by 477 days.

(21) Appl. No.: 15/288,026

(22) Filed: Oct. 7, 2016

(65) Prior Publication Data
US 2018/0099695 A1 Apr. 12, 2018

(51) Int. Cl.
*B62D 15/00* (2006.01)
*B62D 15/02* (2006.01)
*B62D 5/04* (2006.01)
*B62D 3/12* (2006.01)
*G01P 3/00* (2006.01)

(52) U.S. Cl.
CPC ........... *B62D 15/024* (2013.01); *B62D 3/126* (2013.01); *B62D 5/049* (2013.01); *B62D 5/0484* (2013.01); *B62D 5/0487* (2013.01); *G01P 3/00* (2013.01)

(58) Field of Classification Search
CPC .......................... B62D 15/021; B62D 15/024
See application file for complete search history.

(56) References Cited

U.S. PATENT DOCUMENTS 5,343,393 A * 8/1994 Hirano ................ B62D 5/092
180/413
2008/0119986 A1 5/2008 We et al.
2017/0334482 A1 11/2017 Kojima

FOREIGN PATENT DOCUMENTS

| CN | 103921841 A | 7/2014 |
| CN | 104428194 A | 3/2015 |
| CN | 105579324 A | 5/2016 |
| CN | 105946971 A | 9/2016 |
| DE | 69118964 T2 | 12/1996 |
| DE | 19856304 A1 | 10/1999 |
| DE | 10003564 A1 | 8/2001 |
| DE | 102008021847 A1 | 11/2009 |
| DE | 102012012996 A1 | 1/2013 |

OTHER PUBLICATIONS

English Translation of German Office Action for German Application No. 102017122945.0 dated Aug. 3, 2018, 9 pages.
China National Intellectual Property Administration, The First Office Action, Application No. 201710929603.3, dated Sep. 30, 2019.

* cited by examiner

*Primary Examiner* — Lisa M Caputo
*Assistant Examiner* — Alex T Devito

(57) ABSTRACT

Technical solutions are described for estimating handwheel angle of a steering wheel of a vehicle based on road wheel rotational speed data. In one or more examples, the technical solutions are used when the vehicle does not have a sensor to measure the handwheel angle, or if the handwheel angle sensor is faulted and unable to provide data on the actual handwheel angle.

17 Claims, 5 Drawing Sheets

| Case | Front | | Rear | | Comments |
| --- | --- | --- | --- | --- | --- |
| | R_ND | L_ND | R_D | L_D | |
| 1 | X | X | | | Primary calculation |
| 2 | X | | X | | |
| 3 | X | | | | |
| 4 | | X | X | X | Don't use Right Turn |
| 5 | | X | | X | Don't use Left Turn |
| 6 | | | X | X | Very similar on 2 wheel steer |

Fig. 3

STEERING SYSTEM HANDWHEEL ANGLE DETERMINATION

TECHNICAL FIELD

The present application generally relates to electric power steering (EPS) systems, and particularly to EPS systems that facilitate rack and pinion limiting, by automatically determining an angle of handwheel.

BACKGROUND

An electric power steering (EPS) system of a vehicle facilitates a variety of steering functions and applications. For example, steering functions include active return to a center position, rack travel limit functions, and the like. Further, to prevent steering parts of a suspension or tires to contact other parts of the vehicle the EPS limits movement of a rack shaft of the EPS. Further yet, applications of the EPS facilitate automated vehicle functions, such as parking assist, where a vehicle, or an electronic control unit (ECU) of a vehicle, sends messages and/or commands to the EPS to turn to one or more handwheel angles to park the vehicle. Thus, it is desirable to determine a current handwheel angle of the EPS to provide above described and other steering functions and applications.

SUMMARY

According to one or more embodiments, an electric power steering (EPS) system for computing handwheel angle based on wheel speeds includes a handwheel angle module. The handwheel angle module receives a first wheel speed for a first wheel. The handwheel angle module also receives a second wheel speed for a second wheel. The handwheel angle module also determines the handwheel angle based on the first wheel speed, the second wheel speed, a first calibration factor, and a second calibration factor.

According to one or more embodiments, a system for determining handwheel angle in a steering system based on wheel speeds includes a handwheel angle module. The handwheel angle module determines a state of a handwheel position sensor. In response to the handwheel position sensor being in an invalid state, the handwheel angle module receives a first wheel speed for a first wheel, and a second wheel speed for a second wheel. The handwheel angle module also determines a handwheel angle based on the first wheel speed, the second wheel speed, a first calibration factor, and a second calibration factor.

According to one or more embodiments, a steering system controller for determining a handwheel angle in a steering system, in response to vehicle speed being below a predetermined threshold, receives a first wheel speed for a first wheel, and a second wheel speed for a second wheel. The steering system controller also determines a handwheel angle based on the first wheel speed, the second wheel speed, a first calibration factor, and a second calibration factor.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates a table for selecting a combination of wheel speed signals for determining a calibration factor;

DETAILED DESCRIPTION

Figure 1:
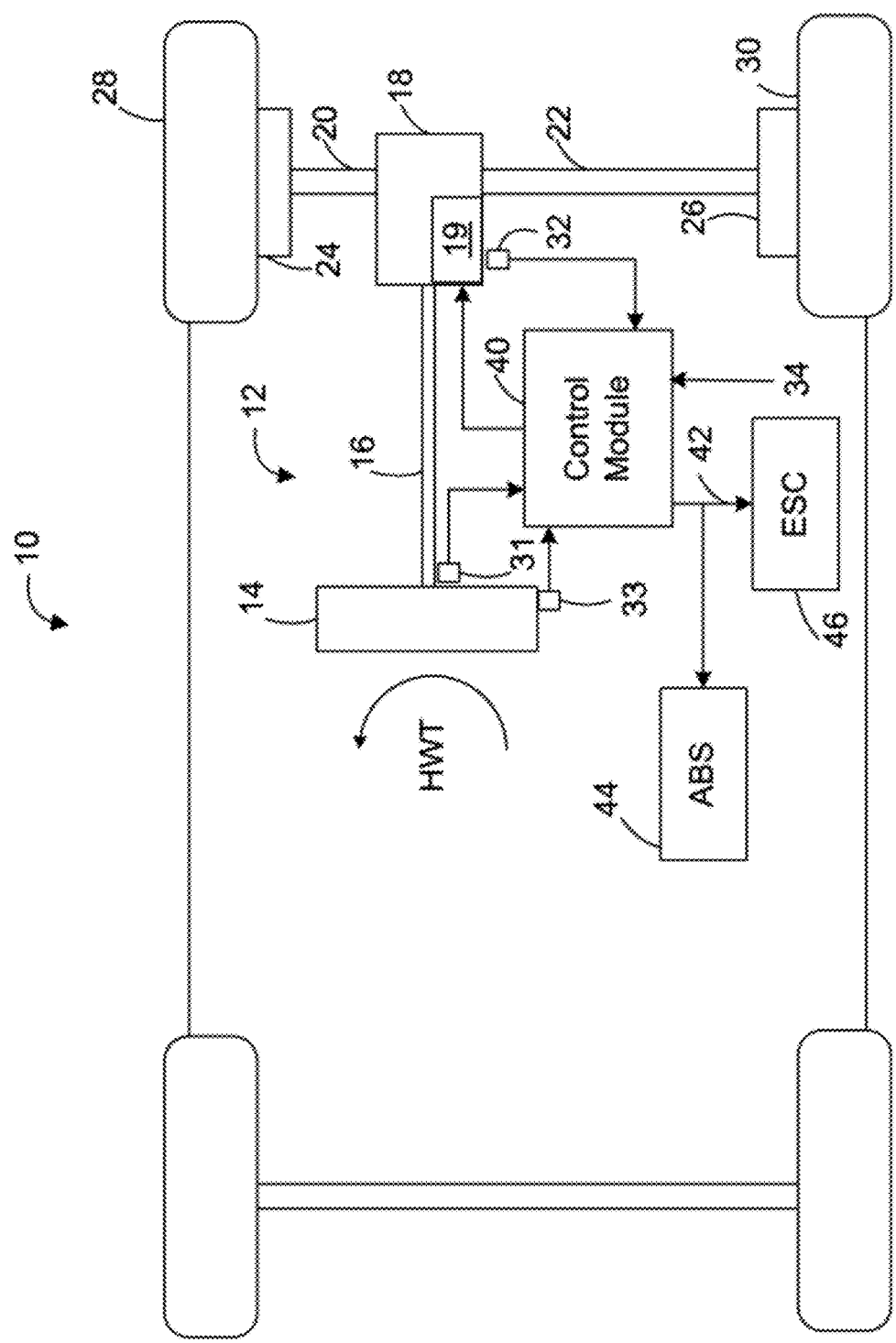
FIG. 1 depicts a schematic diagram of a motor control system in accordance with exemplary embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions described herein provide an electric power steering (EPS) system that limits movement of a rack shaft of the EPS, particularly in a sensor-less environment and at speeds below a predetermined threshold, such as when a vehicle is being started. In one or more examples, the EPS may have a predetermined limit within which the rack shaft may move. Exceeding the limit may lead to wheel/body contact, tie rod impact, and other conditions, which may be detrimental to performance of the vehicle, and/or inconvenience a user.

Accordingly, in one or more examples, technical solutions described herein facilitate the EPS to limit the movement of the rack shaft based on determining a center of a handwheel (steering wheel) of the EPS, by determining handwheel angle (HWA) of the handwheel. The handwheel angle may also be referred to as pinion angle. Typically, the EPS uses sensors, such as a position sensor, which may be a ring/spur gear, mounted in a steering gear or a steering column, to determine the HWA. Alternatively, in case of an invalid state of such sensors, such as absence or in case of a failure of the sensors, the EPS estimates the HWA. For example, the EPS estimates the HWA by monitoring a lateral acceleration and/or yaw rate while the vehicle is being driven forward. Alternatively or in addition, the EPS estimates the HWA by monitoring a driver handwheel torque, vehicle speed, and changes to a position of a motor of the EPS while the vehicle is being driven forward at highway speeds, such as 20 KPH or higher.

However, the typical technical solutions used require that the vehicle be in motion at least at a predetermined speed, such as 20 KPH or higher. Thus, at least in cases where the vehicle is at lower speeds, such as when the vehicle is being started, or when the vehicle is being parked, or other is being maneuvered at speeds lower than the predetermined speed, without limiting the movement of the rack shaft, the undesirable effects may occur. Accordingly, the technical solutions described herein facilitate the EPS to prevent tie rod impact, wheel/body contact, and other such effects by limiting the rack at speeds lower than the predetermined speeds, and further in a sensor-less environment.

Further, the typical technical solutions used take at least a few seconds to estimate the HWA, and thus the center of the handwheel. For example, the typical solutions use wheel speeds to calculate a yaw, and then use the yaw to calculate the HWA. Accordingly, when the vehicle is being started, the typical solutions may not prevent the undesirable effect in case the user maneuvers the handwheel as soon as the vehicle is started, because yaw may not be calculated. The technical solutions described herein facilitate the EPS to determine the HWA substantially instantaneously, by directly computing the HWA at low speeds based on one or more vehicle signals, and thus provide an improved rack movement limiting. For example, the technical solutions described herein provide an estimate of HWA within 90 degrees in less than 2 meters of vehicle travel. In one or more examples, a vehicle signal may include multiple data, such as multiple sensor or measurement data.

Thus, the technical solutions described herein facilitate an EPS with a fast estimate of HWA to provide protection for rack limitation, in case the sensors are in an invalid state, such as in case of failure (or absence) of position sensors to detect the HWA.

Referring now to the Figures, where the technical solutions will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
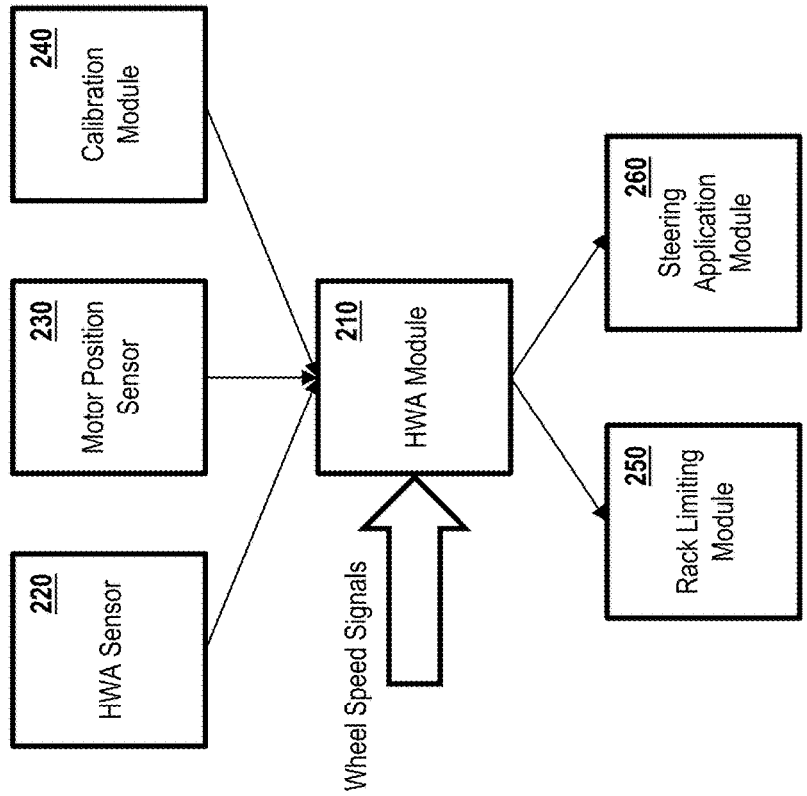
FIG. 2 illustrates a block diagram of example components that facilitate a steering system to determine a handwheel angle.

FIG. 2 illustrates a block diagram of example components that facilitate the steering system 12 to determine the HWA, even at speeds below the predetermined threshold. In one or more examples, the components may be part of the control module 40. Alternatively or in addition, the illustrated components may be separate from the control module 40. The components include hardware, such as electronic circuitry. In one or more examples, the components may include non-transitory computer readable storage medium with computer executable instructions embedded therein. In the description that follows the components are described as being part of the steering system 12, but it is understood that in other examples, the components may be a separate system that communicates with the steering system 12.

In one or more examples, the components include a HWA module 210, a HWA sensor 220, a motor position sensor 230, a calibration module 240, a rack limiting module 250, and a steering application module 260 among others. One or more of the modules may communicate with one another. For example, the HWA module 210 may receive status messages from the HWA sensor 220, and the motor position sensor 230. Alternatively or in addition, the HWA module 210 receives one or more calibration factor values from the calibration module 240. Further, the HWA module 210 may output HWA value(s) to the rack limiting module 250 and the steering application module 260.

In one or more examples, the rack limiting module 250 limits the movement of the rack shaft according to the HWA value output by the HWA module 210. For example, the rack limiting module 250 determines if an end-of-travel (EOT) condition is met based on the HWA estimate from the HWA module 210. In one or more examples, the EOT condition may be a threshold HWA with respect to a center position of the handwheel 14. As described herein, the rack limiting module 250, based on the HWA estimate, prevents the rack shaft of the steering system 12 to travel beyond the predetermined limits, thus preventing possible damage such as tires (wheels) rubbing against other fender, or other parts of the vehicle, tie-rod impact, and the like.

Further, the steering application module 260 receives the HWA estimate from the HWA module 210. The steering application module 260 uses the HWA estimate for one or more steering application, such as parking control, handwheel return assist, or any other autonomous or semi-autonomous control of the handwheel 14 of the steering system 12. It is understood that the components may include additional steering application modules that receive the HWA estimate value as input.

In one or more examples, the HWA sensor 220 and the motor position sensor 230 may be one or more of the sensors 33. Alternatively, the HWA sensor 220 and the motor position sensor 230 may be additional sensors. The HWA sensor 220 may identify the HWA of the handwheel 14. In one or more examples, the HWA sensor 220 may include one or more sensors. In one or more examples, the HWA sensor 220 sends the HWA value to the HWA module 210, which in turn relays the information to other modules that receive the HWA value as input. In one or more examples, the HWA module 210 uses the sensor information from the HWA sensor 220 to compute the HWA estimate value. The HWA sensor 220 additionally indicates, to the HWA module 210, a status of the HWA sensor 220. For example, the HWA sensor 220 may experience a failure, such as low battery, or any other failure. Alternatively or in addition, the HWA sensor 220 may not be operable until a specific vehicle speed is reached, and thus during ignition of the vehicle, the HWA sensor 220 may indicate a failure condition. Accordingly, in one or more examples, in response to the HWA sensor 220 indicating a failure condition, the HWA module 210 computes the HWA estimate value.

In one or more examples, the motor position sensor 230 identifies and relays information about the position of the motor 19 of the steering system 12. In one or more examples, the motor position sensor 230 transmits the sensor information to the HWA module 210. For example, in case the HWA sensor 220 is in condition of failure, or if the steering system 12 is not equipped with the HWA sensor 220, the HWA module 210 estimates the HWA value based on the information from the motor position sensor 230. In one or more examples, the HWA module 210 accesses the information from the motor position sensor 230 in response to detecting a failure of the HWA sensor 220. Alternatively or in addition, the motor position sensor 230 continuously transmits the motor position to the HWA module 210, such as at a predetermined frequency. In one or more examples, the HWA may be determined as a ratio of motor pinion angle added with an offset that the HWA module 210 determines. The ratio of the motor pinion angle may be 25:1, or any other ratio specific to the vehicle and/or the steering system 12. Accordingly, the HWA module 210 determines the HWA angle based on the information from the motor position sensor.

The HWA module 210, further receives as input, wheel speed signals. The wheel speed signals may provide a speed value or a rotation-count value for one or more of the wheels (tires) of the vehicle 10. In one or more examples, the HWA module 210 computes the wheel speed using the rotation-count value. For example, the HWA module 210 uses a predetermined conversion factor that is specific for the vehicle 10, such as 32 counts per KPH, or the like. In one or more examples, the wheel speed signals broadcast 0 (zero) until a predetermined threshold, such as 22 counts (0.6875 KPH), or any other predetermined threshold.

The HWA module 210 further receives one or more calibration factors from the calibration module 240. In one or more examples, the calibration module 240 may provide a predetermined calibration factor. Alternatively or in addition, the calibration module 240 computes the one or more calibration factors as the steering system 12 is being operated. In one or more examples, the calibration module 240 stores the computed calibration factors and provides the values to the HWA module 210 in response to a corresponding request from the HWA module 210.

Based on the inputs, the HWA module 210 estimates the HWA value when the HWA sensor 220 and/or the motor position sensor 230 are absent or in failure condition. In one or more examples, the HWA module 210 estimates the HWA value at low speeds, such as below a predetermined threshold, as described herein. In one or more examples, the HWA module 210 estimates the HWA value using an equation such as, $$HWA = C1 * \frac{(R\_ND - L\_ND)}{(R\_ND + L\_ND)} + C2 \qquad \text{Equation (1)}$$

where HWA is the handwheel angle (or pinion angle) in degrees, R_ND is the right non-driven wheel speed, L_ND is the left non-driven wheel speed, C1 is a first calibration factor in degrees, and C2 is a second calibration factor in degrees. In a two wheel drive vehicle, the "Driven" wheels are the ones driven by the transmission, and the "Non-Driven" are the wheels that are not connected to the drivetrain. For example, in case of a rear-wheel drive vehicle such as a pickup truck, the rear wheels may be the driven wheels, and the front wheels the non-driven. In case of a front-wheel drive vehicle such as a car, the front wheels are the driven wheels, and the rear wheels are the non-driven. In the example scenario used herein, the powertrain may only drive the rear wheels, so the front wheels are Non-Driven. It is understood that in other examples, other combinations of wheel speeds can be used, as shown in FIG. 3.

In one or more examples, the calibration module 240 computes the first calibration factor C1 as a relationship between two wheel speeds of the vehicle 10. The value of C1 may be specific to the vehicle 10. For example, the calibration module 240 determines C1 based on tire wear, wheel changes, vehicle customization, and the like. In one or more examples, the calibration module 240 stores a default value for C1 and updates the value as the steering system 12 is maneuvered. For example, when the steering system 12 is being operated, without a failure condition, the calibration module determines a relationship between the wheel speeds and the HWA value that the HWA sensor provides. For example, the calibration module 240 determines the first calibration factor C1 when a vehicle speed is less than a predetermined threshold, such as 20 KPH. Alternatively or in addition, the calibration module 240 determines C1 when the HWA value from the HWA sensor 220 is more than 90 degrees. Alternatively or in addition, the calibration module 240 determines C1 when L_ND and R_ND are different from each other by a predetermined value, such as at least 0.3 KPH. In one or more examples, the calibration module 240 ensures that the L_ND and R_ND values are valid by comparing the values on multiple intra-vehicle communication networks. The calibration module 240 may further ensure that the HWA sensor 210 is valid, that is not in a failure condition, prior to using the HWA value for determining C1

In one or more examples, the calibration module 240 determines C1 based on a predetermined model, such as a linear model, a parabolic model, or the like. The predetermined model to be used may depend on the two signals from the wheel speed signals used for determining C1. For example, a pair of signals may be selected for determining C1. In case the vehicle 10 is equipped with four wheels, the wheel speed signals received may include signals from a left front wheel, a right front wheel, a left rear wheel, and a right rear wheel. If the vehicle 10 is equipped with additional wheels, the wheel speed signals may include additional signals. The steering system 12 may be a front-wheel, rear-wheel, or an all-wheel drive system. The table in FIG. 3 illustrates different combinations of the wheel signals that the calibration module 240 uses to determine C1. For example, the calibration module 240 may use the wheel speed signals from the left front wheel 310 and the right front wheel 320 (Case 1). Alternatively or in addition, the calibration module 240 uses the wheel speed signals from the left front wheel 310 and the right rear wheel 340 (Case 4). As illustrated, any other combination of the wheel speed signals may be used for determining C1.

In one or more examples, the calibration module 240 determines C1 based on the selected pair of wheel signals. The calibration module 240 determines C1 to determine the HWA based on a difference between the wheel speeds. For example, if the driver is making a right turn, the wheel speed of the right front wheel 330 may be faster or slower than the left rear wheel 330, depending on the handwheel angle. On either right or left turn, the rear wheels track inside of the front wheel on the same side, and have a slower wheel speed. The calibration module 240 determines a relationship between the handwheel angle and the difference in the wheel speeds.

Figure 4:
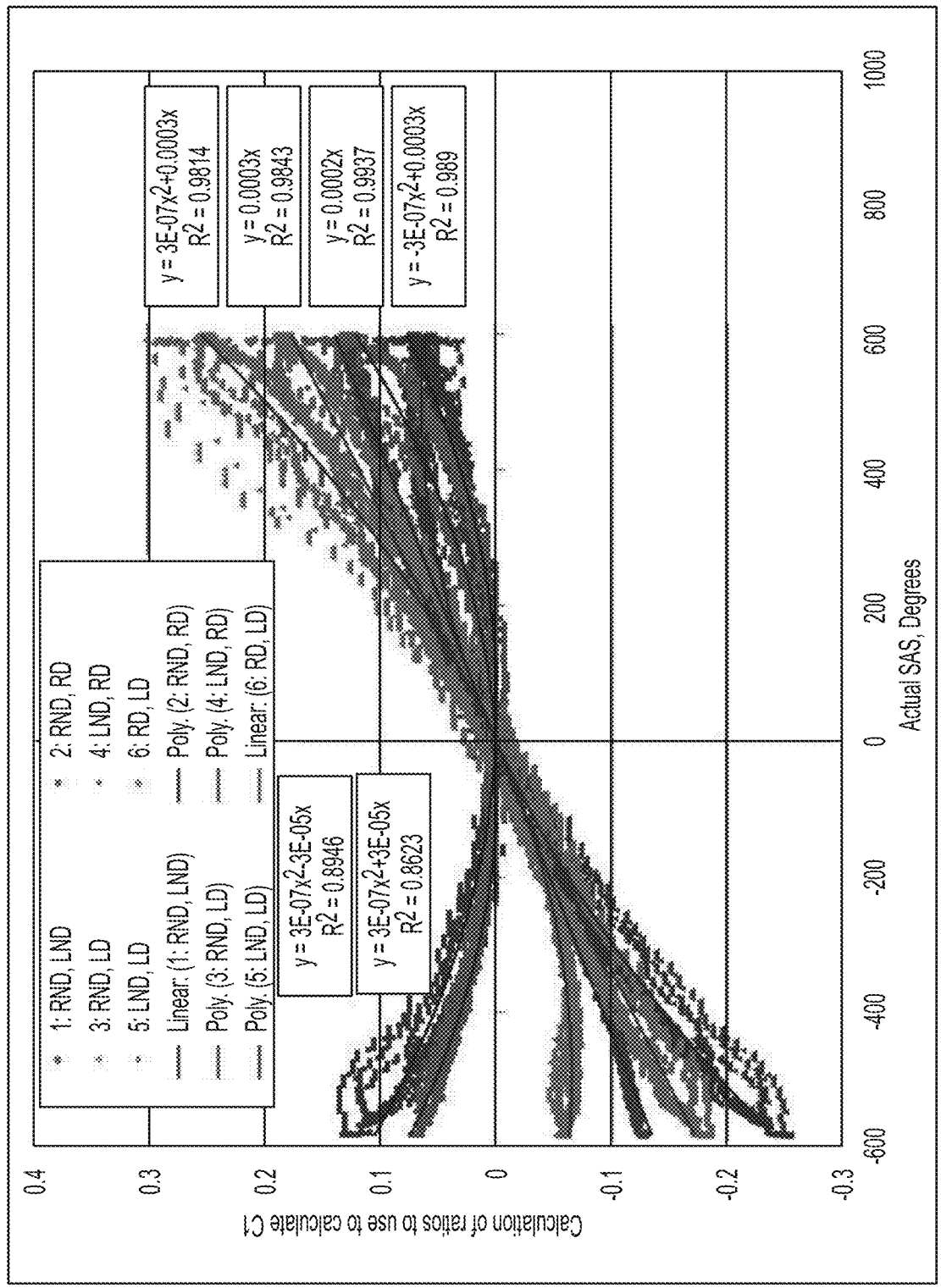
FIG. 4 illustrates examples of mathematical models that may be used for determining a calibration factor.

In one or more examples, the calibration module 240 selects a predetermined mathematical model to calculate C1 based on the wheels signals being used for determining the C1. FIG. 4 illustrates examples of mathematical models that may be used for determining C1. For example, the calibration module 240 uses a linear model for determining C1 if the pair of signals being used includes only front wheel signals, or only rear wheel signals. The calibration module 240 may use a parabolic model if cross-wheel signals are used, that is the pair of signals includes one front wheel signal and one rear wheel signal. It is understood, that above selections of the mathematical model are examples and that different examples may use a different selection.

In one or more examples, the calibration module 240 computes C1 on a periodic basis. In one or more examples, the calibration module 240 stores the most recent computed value of C1 to output to the HWA module 210 for estimating the HWA. Alternatively or in addition, the calibration module 240 computes a new C1 value based on the most recent computed C1 value and a previously stored C1 value, for example by averaging the two values, and stores the new C1 value. For example, if $C1_{t-1}$ is the stored value, and if $C1_{t-temp}$ is the value the most recent computed value, the calibration module 240 computes $C_t$ by averaging $C1_{t-1}$ and $C1_{t-temp}$, and stores $C1_t$ in place of $C1_{t-1}$.

In one or more examples, the calibration module 240 determines C1 values based on more than one pair of signals and computes and stores an average of the computed values.

In one or more examples, the second calibration factor C2 may be a HWA sensor offset error from alignment, that the calibration module 240 computes during the operation of the steering system 12. For example, the HWA value from the HWA sensor 220 may not be 0 (zero) when the vehicle 10 is driving straight. For example, the difference (from 0) may be due to an error in wheel alignment, or an error in alignment of the steering system 12 and the wheels of the vehicle. Accordingly, C2 is an offset such that the resulting HWA is 0 degrees when the vehicle 10 is driving straight. In one or more examples, the value of C2 is 0 (zero) by default, and is updated as the vehicle 10 is driven. For example, C2 may be determined when, for at least 10 messages of the wheel signals, L_ND and R_ND are above a predetermined speed value, such as 60 KPH, the L_ND and R_ND are within a predetermined threshold, such as 0.25 KPH, and when the handwheel gradient is substantially zero. The handwheel gradient is the velocity of the handwheel of the steering system 12, in degrees/second. In response to the above conditions, the calibration module 240 stores the HWA value from the HWA sensor 220 as the value of C2.

Thus, using the calibration factors C1 and C2, the HWA module 210 provides a fast, coarse estimate of handwheel angle, such as to provide for protection to the rack limiting module 250 and the other steering application module 260. For example, the HWA module 210 estimates the HWA within 90 degrees in less than 2 meters of vehicle travel. As described herein, the HWA module 210 generates the HWA estimate in response to the HWA sensor 220 being absent or in failure, and further the vehicle speed being below the predetermined threshold.

In one or more examples, the HWA module 210 generates a separate signal, referred to as HWA authority signal, that indicates whether to use the HWA estimate from the HWA module 210. For example, the HWA authority signal may be set at value 0 (zero) at vehicle startup. Once all vehicle speed signals are above a threshold, such as 1 KPH, the HWA module 210 estimates the HWA and sets the HWA authority to a value of 0.1, or the like (below 1). The HWA estimation and the HWA authority signal may be setup irrespective of whether the vehicle 10 is moving forward or in reverse direction. In one or more examples, the steering application module 260, and the rack limiting module 250 is enabled based on the HWA authority signal being greater than 0. Accordingly, once the HWA has been estimated, the HWA module 210 configures the HWA authority signal to a positive non-zero value to so that the rack limiting module 250 initiates the protection for end-of-travel and or the rack limiting before end of travel is reached. Because the estimated HWA value may be off (such as by 50 degrees), the HWA authority signal is not set to 1 (or any other value) that indicates that the HWA value is accurate. Instead, by setting the HWA value to less than 1 (such as 0.1), the HWA module 210 indicates that the HWA value is an estimate.

It is understood that even though the HWA module 210 indicates that the HWA value is an estimate, one or more functions can use the HWA value to improve performance. For example, in case of the active return function, when vehicle speed is greater than 0 and less than a predetermined threshold, and when the handwheel angle is not 0 degrees, the steering system 12 applies a torque to return the handwheel back to center, or to 0 degrees. In case the HWA authority is not=1, the return function will be scaled so that at least some returnability function is included.

Once vehicle speeds signals are above a predetermined threshold, such as 10 KPH, the HWA value is determined based on the HWA sensor 220 and/or the motor position sensor 230, and the HW authority signal is set to 1 (or any other value) to indicate that the HWA value is accurate. The HWA for the rest of the ignition cycle is based on the motor position sensor 230, unless the motor position sensor 230 indicates a failure.

Further, the HWA value from the HWA module 210 depends on the vehicle speed, and thus wheel speed. For example, consider that at 1 KPH and near a corner, a 1 rotation-count difference in wheel speed (between front left and front right wheels), changes the HWA by 62 degrees based on the C1 and C2 calibration factors from the calibration module 240. At 10 KPH, the 1 rotation-count difference may change the HWA by 6.2 degrees, and at 100 KPH, the difference may represent an HWA change of 0.62 degrees.

Figure 5:
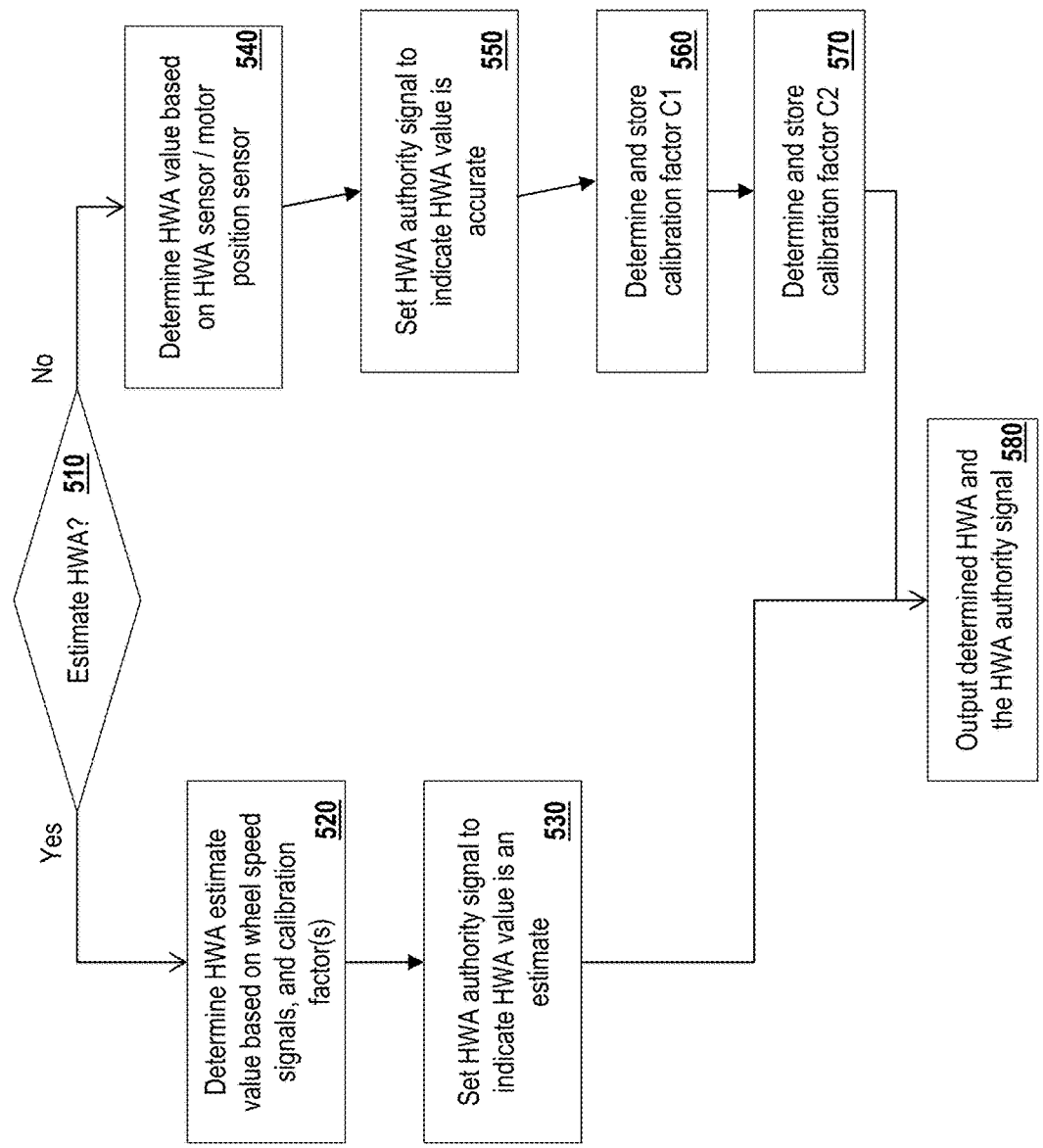
FIG. 5 illustrates a flowchart of an example method for providing an HWA value for rack limiting and other steering applications.

FIG. 5 illustrates a flowchart of an example method for providing an HWA value for rack limiting and other steering applications. The method may be implemented by the HWA module 210. In one or more examples, the HWA module may be part of the control module 40. The HWA module 210 determines if HWA is to be estimated, as shown at block 510. The HWA module 210 determines that the HWA is to be estimated based on one or more of a state of the HWA sensor 220, the motor position sensor 230, and the vehicle speeds. For example, the HWA module 210 estimates the HWA in response to the vehicle ignition cycle in progress.

If the HWA is to be estimated, the HWA module 210 computes the HWA estimate value, as shown at block 520. As described herein, the HWA module 210 determines the HWA estimate value based on the Equation 1. While Equation 1 uses individual wheel speeds, the HWA module 210 computes the HWA from any other vehicle signal that produces a relative road wheel rotational position or rotational speed, such as ABS pulse counts, transmission shaft speed or rotation angle, wheel frequencies, and any other vehicle data that can be converted to an individual wheel speed. Further, the HWA estimate value may be determined while the vehicle 10 is moving forward or in reverse. Further, the HWA module 210 estimates the HWA even when the steering system is maneuvered in a static position, that is, at 0 KPH vehicle speed. The HWA module further sets up the HWA authority signal to indicate HWA value is an estimate, as shown at block 530. For example, the HWA module 210 sets up the HWA authority signal to a value between 0 and 1, if 1 indicates that the HWA value is accurate and 0 indicates that the HWA value is not determined.

Instead, if the HWA value is not to be estimated, the HWA module 210 determines the HWA value based on input from the HWA sensor 220 and/or the motor position sensor 230, as shown at block 540. The HWA module 210 further sets up the HWA authority signal to indicate HWA value is accurate, such as by setting the signal to 1, as shown at block 550. In addition, the calibration module 240 determines and stores the first calibration factor C1, as shown at block 560. The calibration module 240 determines the value for C1 specific to the vehicle 10, as described herein. Further, calibration module 240 determines and stores the second calibration factor C2 as described herein, as shown at block 570.

The HWA module 210 further outputs the computed HWA value and the HWA authority signal value, as shown at block 580. In one or more examples, the rack limiting module 250 and/or the steering application module 260 receives the HWA value and the HWA authority signal for corresponding operations.

In other words, the control module 40 determines whether to estimate the HWA, at block 510. If yes, then the control module computes the HWA as described herein, at block 520. The HWA authority value is set to indicate a quality of the HWA, at block 530. This may be set to 0.0 before the vehicle is in motion. Then an initial calculation of HWA at low speeds may set the authority to 0.2. After driving a predetermined time at least a predetermined (highway) speeds, the authority may be set to 1.0. Other functions, such as active return, may limit the response based on the handwheel authority. If block 510 determines that the HWA can be measured (and not estimated) using one or more sensors, then the control module determines the HWA and handwheel authority from the sensor data, at blocks 540 and 550. Further, at blocks 560 and 570, the control module determines the calibration factors C1 & C2 and stores the calibration factors. Further yet, at block 580 the HWA and the handwheel authority is output and/or stored.

Accordingly, the technical solutions described herein facilitate a steering system, such as an EPS, to provide an estimated handwheel angle for functions such as active return to center and rack travel limiting in case of low vehicle speeds and/or when one or more sensors that provide the handwheel angle are absent or in a state of failure. The technical solutions described herein facilitate determining the handwheel angle based on differences between wheel speeds by determining one or more calibration factors during operation of the vehicle. Accordingly, the handwheel angle can be estimated when the vehicle is being started, or when the vehicle is being parked (low speeds) and facilitate functions such as rack limiting and end-of-travel protection even at low speeds based on the estimated handwheel angle.

As described herein, the handwheel angle, or the pinion angle may be computed from the formula: $HWA = C1*(R-L)/(R+L) + C2$, where HWA is the Handwheel angle, R & L are right and left wheel speeds, and C1, C2 are calibration factors specific for a vehicle. If the HWA is not known (initial start up with sensorless system, or sensor fault), the wheel speeds and calibration factors are used to calculate the HWA. Wheel speeds may be in kph, rpm, Hertz, or any other measurement that describes wheel rotation. The calibration factors are determined from the wheel speeds and their relationship to the HWA, which is based on the mechanical design of the vehicle.

The calibration factors are initially established based on data from functional sensors. C1 is used to convert the ratio of wheel speeds to the handwheel angle. C2, which may typically be zero, is included for use where wheel speeds may not be as expected. For example, the vehicle usage wears down one tire faster than the other, so that when the vehicle is being driven straight ahead, the individual wheel speeds are different. In another example, a compact spare tire may be installed, which is significantly smaller than the other wheel. For such examples, the computation of the handwheel angle is adjusted by C2 to offset the handwheel angle to 0 degrees (center position) when the vehicle is being driven straight.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. An electric power steering (EPS) system for computing handwheel angle based on wheel speeds, the EPS system comprising:
   a handwheel angle module configured to:
      receive a first wheel speed for a first wheel; and
      receive a second wheel speed for a second wheel;
   a calibration module configured to:
      compute a first calibration factor based on the first wheel speed and the second wheel speed using a predetermined model;
      compute a second calibration factor based on an offset error in a wheel alignment sensor;
   wherein the handwheel angle module is further configured to:
      receive the first calibration factor and the second calibration factor from the calibration module; and
      determine the handwheel angle based on the first wheel speed, the second wheel speed, the first calibration factor, and the second calibration factor based on $$HWA = C1 * \frac{(R-L)}{(R+L)} + C2,$$

where HWA is the handwheel angle, R is the first wheel speed, L is the second wheel speed, C1 is the first calibration factor, and C2 is the second calibration factor.

2. The electric power steering (EPS) system of claim 1, wherein the handwheel angle module determines the handwheel angle in response to a vehicle-speed being below a predetermined threshold.

3. The electric power steering (EPS) system of claim 1, wherein the handwheel angle module determines the handwheel angle in response to a failure of a handwheel position sensor.

4. The electric power steering (EPS) system of claim 3, wherein the handwheel angle module determines the handwheel angle further in response to a failure of a motor position sensor.

5. The electric power steering (EPS) system of claim 1, wherein the calibration module is configured to determine the first calibration factor in response to a handwheel position sensor being invalid.

6. The electric power steering (EPS) system of claim 1, wherein the calibration factor module configured to determine the second calibration factor in response to a handwheel position sensor being invalid.

7. The electric power steering (EPS) system of claim 1, wherein the first wheel is a front left wheel and the second wheel is a front right wheel.

8. The electric power steering (EPS) system of claim 1, wherein the first wheel speed and the second wheel speed are determined based on one or more measured signals from the first wheel and the second wheel respectively.

9. A system for determining handwheel angle in a steering system based on wheel speeds, the system comprising:
   a handwheel angle module configured to determine a state of a handwheel position sensor, and in response to the handwheel position sensor being in an invalid state:
      receive a first wheel speed for a first wheel;
      receive a second wheel speed for a second wheel;
      determine a handwheel angle based on the first wheel speed, the second wheel speed, a first calibration factor, and a second calibration factor, wherein the handwheel angle module determines the handwheel angle based on $$HWA = C1 * \frac{(R-L)}{(R+L)} + C2,$$

where HWA is the handwheel angle, R is the first wheel speed, L is the second wheel speed, C1 is the first calibration factor, and C2 is the second calibration factor.

10. The system of claim 9, wherein the handwheel angle module determines the handwheel angle in response to a vehicle-speed being below a predetermined threshold.

11. The system of claim 9, further comprising a calibration module configured to determine the first calibration factor based on the first wheel speed and the second wheel speed in response to the handwheel position sensor being in the invalid state.

12. The system of claim 9, further comprising a calibration module configured to determine the second calibration factor based on an offset error in a wheel alignment sensor in response to the handwheel position sensor being in the invalid state.

13. The system of claim 9, wherein the first wheel speed and the second wheel speed are determined based on one or more measured signals from the first wheel and the second wheel respectively.

14. A steering system controller for determining a handwheel angle in a steering system, the steering controller configured to:

in response to vehicle speed being below a predetermined threshold:
receive a first wheel speed for a first wheel;
receive a second wheel speed for a second wheel;
compute a first calibration factor based on the first wheel speed and the second wheel speed using a predetermined model;
compute a second calibration factor based on an offset error in a wheel alignment sensor; and
determine a handwheel angle based on the first wheel speed, the second wheel speed, the first calibration factor, and the second calibration factor based on $$HWA = C1 * \frac{(R-L)}{(R+L)} + C2,$$

where HWA is the handwheel angle, R is the first wheel speed, L is the second wheel speed, C1 is the first calibration factor, and C2 is the second calibration factor.

15. The steering system controller of claim 14, further configured to determine that a handwheel position sensor is in an invalid state, and determining the handwheel angle responsively.

16. The steering system controller of claim 15, configured to determine the first calibration factor based on the first wheel speed and the second wheel speed in response to the handwheel position sensor being in the invalid state.

17. The steering system controller of claim 15, configured to determine the second calibration factor in response to the handwheel position sensor being in the invalid state.

* * * * *